(12) United States Patent
Choi (10) Patent No.: US 6,307,900 B1
(45) Date of Patent: Oct. 23, 2001

(54) METHOD AND APPARATUS FOR RECOVERING DIGITAL DATA BY EMPLOYING ASYNCHRONOUS DATA SAMPLING TECHNIQUES

(75) Inventor: Byung-Bong Choi, Seoul (KR)

(73) Assignee: Daewoo Electronics Co., Ltd. (KR)

( * ) Notice: Subject to any disclaimer, the term of this patent is extended or adjusted under 35 U.S.C. 154(b) by 0 days.

(21) Appl. No.: 09/108,340

(22) Filed: Jun. 30, 1998

(30) Foreign Application Priority Data

Jun. 30, 1997 (KR) ................................ 97-29520

(51) Int. Cl.[7] ................ H03D 1/00; H04L 27/06; G06F 7/38
(52) U.S. Cl. ................ 375/341; 375/262; 708/290
(58) Field of Search ............... 375/341, 340, 375/262, 316, 350, 355, 229, 230, 232, 265; 360/51, 65; 708/290, 300, 322, 323; 333/18, 28 R; 714/794, 795; 348/358; 381/94.4; 386/73; 704/265

(56) References Cited

U.S. PATENT DOCUMENTS 5,933,452 * 8/1999 Eun ........................ 375/232

6,073,151 * 6/2000 Baker et al. .................. 708/290

FOREIGN PATENT DOCUMENTS 0777211  6/1997 (EP) .

\* cited by examiner

*Primary Examiner*—Stephen Chin
*Assistant Examiner*—Betsy L. Deppe
(74) *Attorney, Agent, or Firm*—Anderson Kill & Olick, P

(57) ABSTRACT

A digital data detection system, equipped with an interpolation apparatus, for generating decoded data by detecting information stored on a magnetic storage medium by interpolating sampled data using a phase difference signal and an interpolation coefficient is provided. The digital data detection system includes a magnetic storage medium, an analog signal acquisition circuit, a pre-amplifier, an A/D converter, an interpolation circuit, an equalizer filter, a data decoder, and a phase error detector. The interpolation circuitry includes an accumulation block, a filter coefficient generation block, a HOLD signal generation block, and an interpolator. The interpolation circuitry generates interpolated data using a phase error signal and an interpolation coefficient provided from a MCU (Main Control Unit).

11 Claims, 6 Drawing Sheets

METHOD AND APPARATUS FOR RECOVERING DIGITAL DATA BY EMPLOYING ASYNCHRONOUS DATA SAMPLING TECHNIQUES

FIELD OF THE INVENTION

The present invention relates to a digital data detection method and an apparatus therefor; and, more particularly, to a method and apparatus for detecting recorded data based on an asynchronous data sampling technique.

DESCRIPTION OF THE PRIOR ART

In a conventional digital data recording/detection system, digital data serves to modulate the current in a recording/reproducing head assembly so that magnetic flux transitions of corresponding sequences are recorded onto a magnetic storage medium, such as a magnetic tape or a magnetic disk, at a predetermined recording rate, wherein the magnetic flux transitions of the corresponding sequences take the form of analog signals. When a recorded signal is reproduced, the recording/reproducing head assembly again passes over the magnetic storage medium and transduces the magnetic transitions into pulses of an analog signal that alternate in polarity. Thereafter, these pulses are amplified by a pre-amplifier and then sampled into digitized data by an A/D converter. Decoding the digitized data into a digital bit stream can be performed by a discrete time sequence detection.

Figure 1:
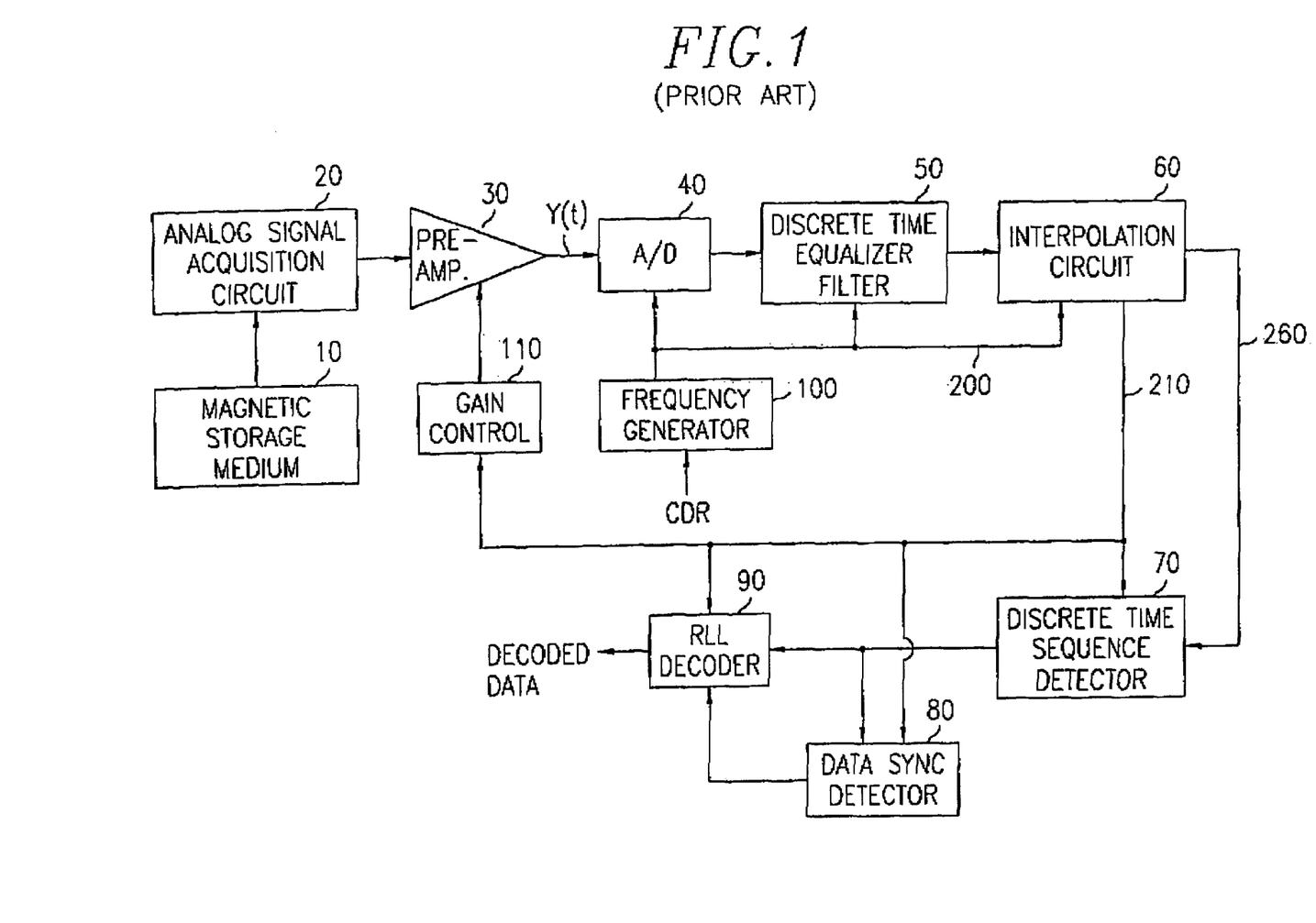
FIG. 1 shows a schematic block diagram for a conventional digital data detection system of the prior art.

Referring to FIG. 1, there is shown a schematic block diagram for a conventional digital data detection system for reproducing recorded digital data, disclosed in U.S. Pat. No. 5,696,639 entitled "Sampled Amplitude Read Channel Employing Interpolated Timing Recovery". The conventional digital data detection system comprises a magnetic storage medium 10, an analog signal acquisition circuit 20, a pre-amplifier 30, an A/D converter 40, a discrete time equalizer filter 50, an interpolation circuit 60, a discrete time sequence detector 70, a data sync detector 80, a RLL (Run Length Limited) decoder 90, a frequency generator 100, and a gain control block 110.

The magnetic storage medium 10 includes data recorded in the form of analog signals, wherein the data is representative of a video or an audio signal, or the like. The analog signal acquisition circuit 20 receives data signals from the magnetic storage medium 10 obtained through a reproducing head assembly (not shown) included therein. Thereafter, the reproduced analog data signals are amplified by the pre-amplifier 30.

When the amplified analog data signals denoted by Y(t) are sampled by the A/D converter 40 in response to a sampling clock provided from the frequency generator 100, wherein the sampling clock has a slightly higher frequency than a recording clock so that the amplified analog data signals are sampled faster than the recording clock rate. The sampling clock 200 is adjusted by a channel data rate (CDR) control signal corresponding to the data record rate. Also, the frequency generator 100 provides the discrete time equalizer filter 50 and the interpolation circuit 60 with the sampling clock 200 for synchronizing same.

After receiving the sampled digital data signals from the A/D converter 40, the discrete time equalizer filter 50 provides further equalization of the sampled digital data signals inputted thereto toward the desired response. The equalized digital data signals are then transmitted to the interpolation circuit 60.

Figure 2:
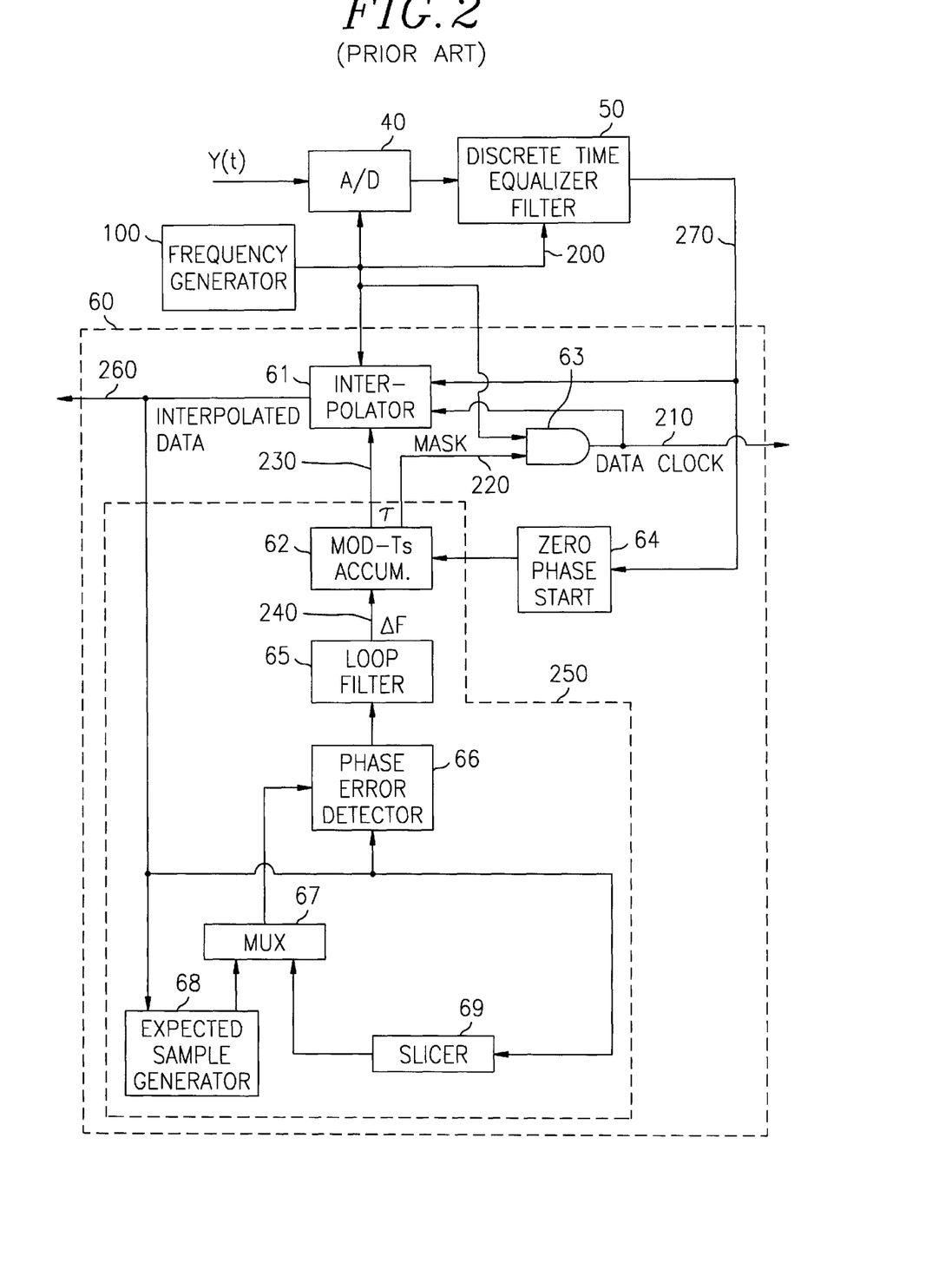
FIG. 2 represents a detailed block diagram for an interpolation circuit used in the conventional digital data detection system.

Referring to FIG. 2, there is illustrated a detailed block diagram of the interpolation circuit 60 according to the prior art. As shown in FIG. 2, the interpolation circuit 60 includes an interpolator 61, an AND gate 63, a zero phase start block 64, and a phase error detection block 250. The phase error detection block 250 contains an MOD-Ts accumulator 62, a loop filter 65, a phase error detector 66, a multiplexer 67, an expected sample generator 68, and a slicer 69.

Figure 3:
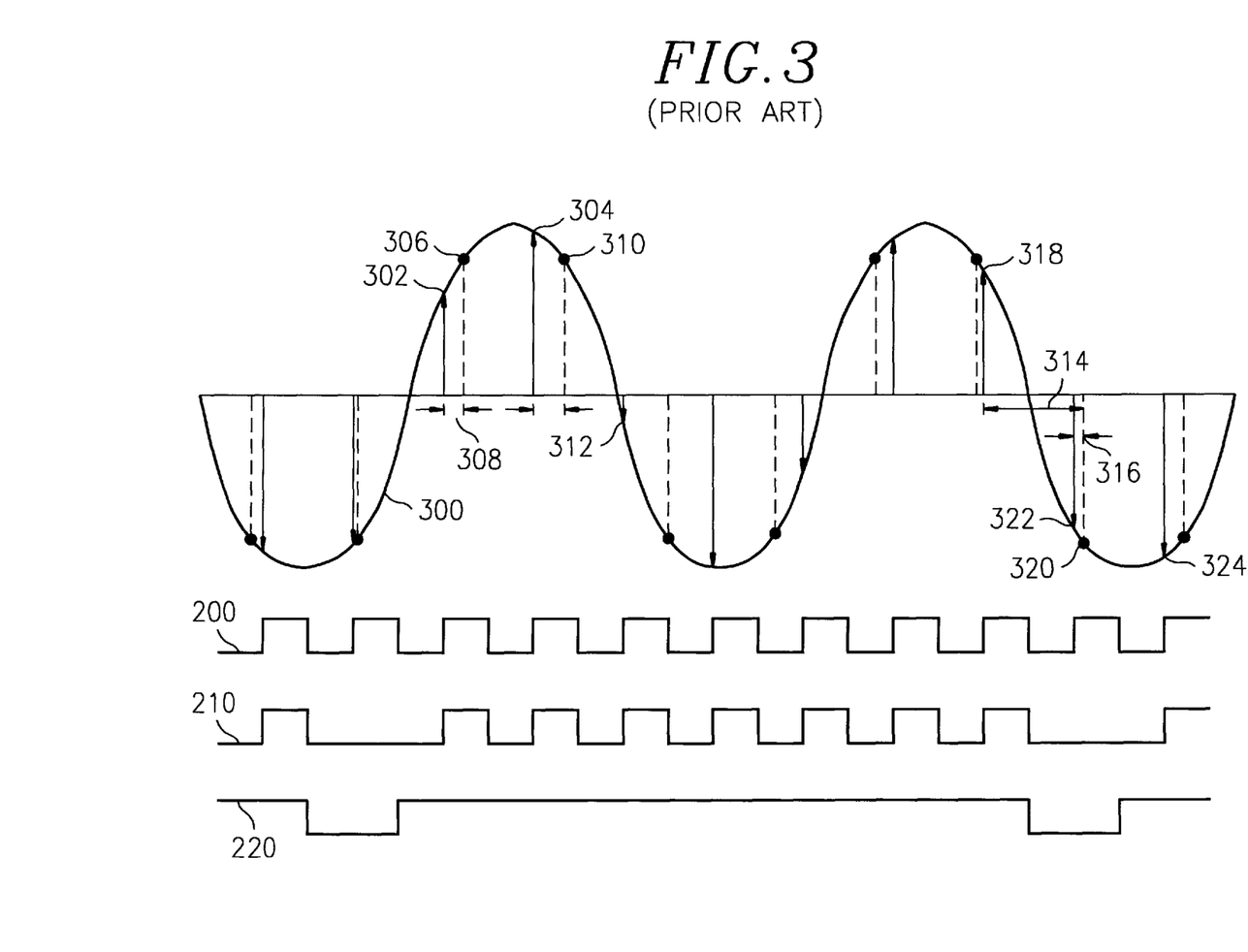
FIG. 3 illustrates a timing diagram for explaining the operation of the interpolation circuit shown in FIG. 2.

The interpolator 61 may be described with reference to FIG. 3 which shows an obtained analog signal 300. Target data values are shown as black circles and sampled data values are depicted with arrows. Below the obtained analog signal 300, there are illustrated a timing diagram depicting the corresponding timing signals for the sampling clock 200, a data clock 210 and a mask signal 220. As can be seen in FIG. 3, the obtained analog signal 300 in the analog signal acquisition circuit 20 is sampled slightly faster than the recording clock rate by the A/D converter 40.

The function of the interpolator 61 is to estimate the target data values by interpolating the sampled data values, wherein the interpolator 61 has a FIR (Finite Impulse Response) filter structure. A simple estimation algorithm as follows is assumed:

$$Y(N-1)=x(N-1)+\tau\{x(N)-x(N-1)\} \quad \text{(Eq. 1)}$$

wherein x(N-1) and x(N) are the sampled data values surrounding the target data value Y(N-1); and τ is an interpolation interval proportional to a time difference between the sampled data value x(N-1) and the target data value Y(N-1). Referring to again FIG. 2, the interpolation interval τ 230 is outputted from the MOD-Ts accumulator 62 which accumulates a frequency offset signal Δf:

$$\tau=(\Sigma\Delta f) \text{ MOD } Ts \quad \text{(Eq. 2)}$$

wherein Ts is the sampling period of the sampling clock 200. Since the sampling clock 200 samples the amplified analog data signals Y(t) at a rate slightly faster than the recording clock rate, it is necessary to mask the data clock 210 whenever the accumulated frequency offset Δf 240, integer divided by Ts, is increased by 1. Operation of the data clock 210 from the AND gate 63 and the mask signal 220 generated by the MOD-Ts accumulator 62 can be understood with reference to the timing diagram of FIG. 3.

Assuming the interpolator 61 implements the simple linear Eq. 1 above, then sampled data values 302 and 304 are used to generate an interpolated data value corresponding to a target data value 306. The interpolation interval τ308 is generated according to Eq. 2 above. A next interpolated data value corresponding to the next target data value 310 is computed from sampled data values 304 and 312. This process continues until the interpolation interval τ314 becomes greater than Ts except that it wraps around and becomes actually τ316. At this point, the data clock 210 is masked by the mask signal 220, so that an interpolated data value corresponding to a target data value 320 is computed from sampled data values 322 and 324 rather than sampled data values 318 and 322.

Referring back to FIG. 2, the expected sample generator 68, responsive to the interpolated data values 260, generates expected data values to be used by the phase error detector 66 to compute a phase error during acquisition. The multiplexer 67 selects estimated data values from the slicer 69 for use by the phase error detector 66 during tracking.

The phase error detector 66 and the slicer 69 process the interpolated data 260 at the output of the interpolator 61 rather than the equalized digital data value 270 at the output of the discrete time equalizer filter 50. The loop filter 65 controls the closed loop frequency response. The zero phase start block 64 minimizes the initial phase error between the sampling clock 200 and the amplified analog signal Y(t).

Returning to FIG. 1, the data clock 210, which is generated at the output of the AND gate 63 in response to the sampling clock 200 from the frequency generator 100 and the mask signal 220 from the MOD-Ts accumulator 62, is transmitted from the interpolation circuit 60 to the discrete time sequence detector 70, the data sync detector 80, the RLL (Run Length Limited) decoder 90, and the gain control block 110. Also, the interpolated data 260 is sent to the discrete time sequence detector 70. The discrete time sequence detector 70, such as a maximum likelihood (ML) Viterbi sequence detector, detects estimated sequences using the interpolated data and the data clock inputted thereto from the interpolation circuit 60. Thereafter, the discrete time sequence detector 70 provides the RLL decoder 90 and the data sync detector 80 with the estimated sequence detected therein. The data sync detector 80 detects a sync data included in the estimated sequence to thereby transmit the sync data to the RLL decoder 90. The RLL decoder 90 decodes the estimated sequence into decoded data based on the sync data fed thereto from the data sync detector 80. The gain control block 110 adjusts a gain of the pre-amplifier 30 with reference to the data clock 210 transmitted thereto from the interpolation circuit 60.

As described above, the conventional digital data detection system has structural complexity. Also, the conventional interpolation circuitry requires the data clock in obtaining the interpolated data.

SUMMARY OF THE INVENTION

It is, therefore, an object of the present invention to provide a simplified gate structural interpolation apparatus for use in a digital data detection system by employing asynchronous data sampling technique.

In accordance with the present invention, there is provided a digital data detection system, including a simplified gate structural interpolation apparatus, for generating decoded data by detecting data stored on a magnetic storage medium by interpolating sampled data using a phase error signal and an interpolation coefficient, wherein the sampled data is sampled based on a sampling clock, comprising: a magnetic storage medium for storing the data; an analog signal detector for detecting the stored data in the form of analog signals from the magnetic storage medium; a pre-amplifier for amplifying the detected analog signals; an A/D converter for sampling the amplified analog signals in accordance with the sampling clock fed thereto from a MCU (Main Control Unit) and generating sampled digital data; an interpolation circuit for interpolating the sampled digital data, in order to generate interpolated data, using the phase error signal and the interpolation coefficient; an equalizer filter for equalizing the interpolated data; a decoder for generating the decoded data by using the Viterbi algorithm employing maximum likelihood sequence detection; and a phase error detector for detecting the phase error signal and transmitting the detected phase error signal to the interpolation circuit.

Also, in accordance with the present invention, there is provided a simplified gate structural interpolation apparatus for generating interpolated data by detecting data stored on a magnetic storage medium by sampling the data using a phase error signal and an interpolation coefficient, wherein the sampled data is sampled based on a sampling clock fed from a MCU (Main Control Unit), comprising: an adder for adding the phase error signal to the interpolation coefficient; an accumulation block for accumulating an output signal of the adder; a filter coefficient generation block for generating a filter coefficient corresponding to the accumulated signal; a HOLD signal generation block for interpreting the accumulated signal to thereby generate a HOLD signal; and the interpolator for generating interpolated data by processing the sampled data together with the corresponding filter coefficient.

Furthermore, in accordance with the present invention, there is provided an interpolation method for generating interpolated data by detecting data stored on a magnetic storage medium by sampling the data using a phase error signal and an interpolation coefficient, wherein the sampled data is sampled based on a sampling clock fed from a MCU (Main Control Unit), comprising the steps of:

a) adding the phase error signal to the interpolation coefficient;

b) accumulating the added signal;

c) generating a filter coefficient corresponding to the accumulated signal;

d) interpreting the accumulated signal to thereby generate a HOLD signal; and e) generating interpolated data by processing the sampled data together with the corresponding filter coefficient.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 4:
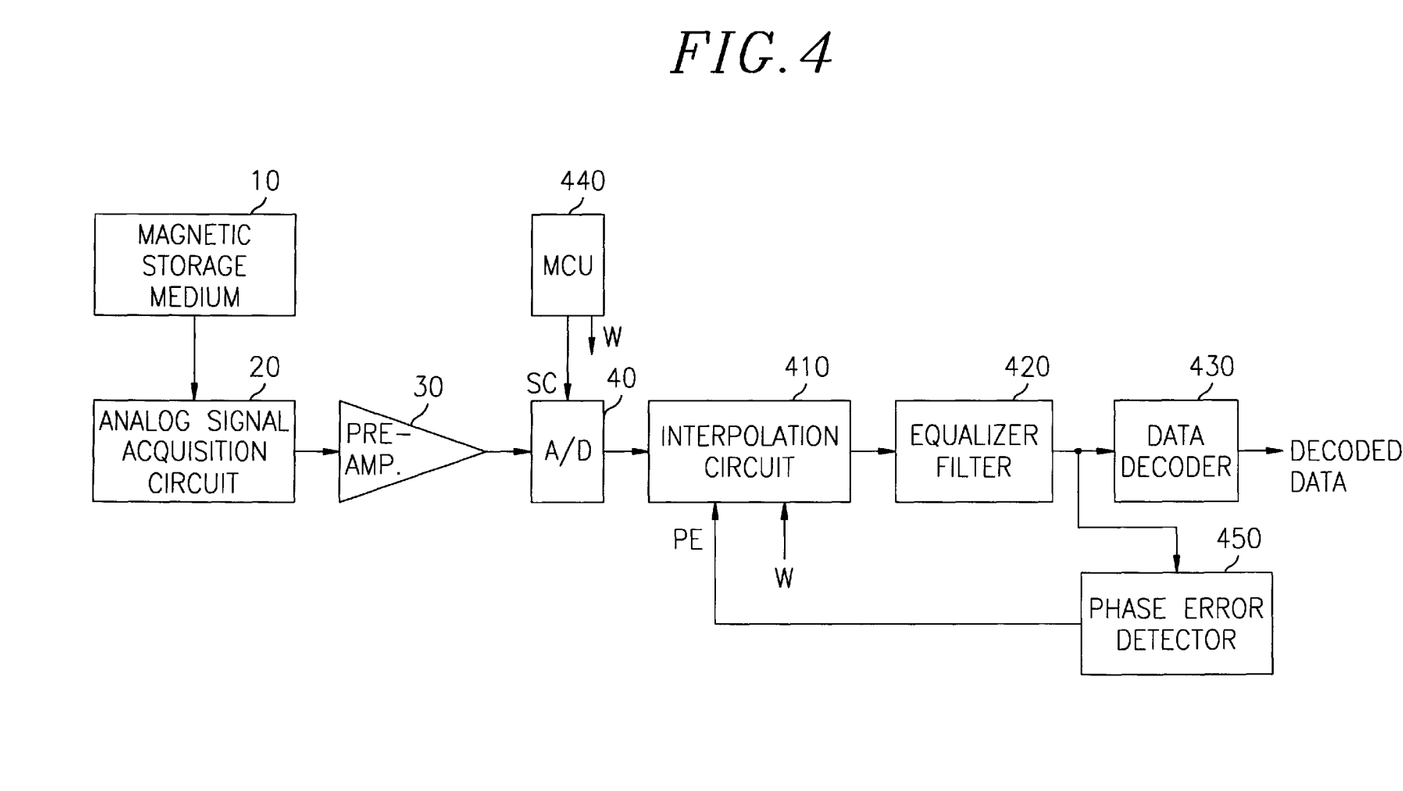
FIG. 4 denotes a schematic block diagram for a digital data detection system in accordance with the present invention.

Now, referring to FIG. 4, there is shown a schematic block diagram of a digital data detection systems in accordance with the present invention. As shown in FIG. 4, the digital data detection systems comprises a magnetic storage medium, e.g., magnetic tape, 10, an analog signal acquisition circuit 20, a pre-amplifier 30, and an A/D converter 40 same as the one shown in FIG. 1, an interpolation circuit 410, an equalizer filter 420, a data decoder 430, a MCU (Main Control Unit) 440, and a phase error detection circuit 450.

Data recorded in the form of analog signals onto the magnetic storage medium 10 is reproduced by the analog signal acquisition circuit 20 provided with a reproducing head assembly (not shown). The recorded data represent a video or an audio signal, or the like as described above. The reproduced analog data signal by the analog signal acquisition circuit 20 are transmitted to the pre-amplifier 30. The analog data signal is amplified by the pre-amplifier 30. Thereafter, the amplified analog data signal is sent to the A/D converter 40. Then, the A/D converter 40 samples the amplified analog data signal based on a sampling clock SC fed thereto from the MCU 440, to thereby generate sampled digital data signal. The frequency of the sampling clock SC is slightly higher than that of a recording clock RC used in data recording process onto the magnetic storage medium 10. The sampled digital data signal is transmitted to the interpolation circuit 410. The interpolation circuit 410 receives the sampled digital data signal, a phase error signal PE fed thereto from the phase error detection block 450, and an interpolation coefficient W inputted thereto from the MCU 440. The interpolation coefficient W may be defined as a ratio of the frequency of SC to that of RC as follows:

$$W = SC/RC \qquad (Eq. 3).$$

Thereafter, the interpolation circuit 410 generates interpolated data based on the sampled digital data signal, the phase error signal PE, and the interpolation coefficient W, and then transmits the interpolated data to the equalizer filter 420. After receiving the interpolated data, the equalizer filter 420 performs equalization of the interpolated data toward the desired response, in the similar manner as in the discrete time equalizer filter 50 shown in FIG. 1. The equalized data is transmitted to the data decoder 430 and the phase error detection block 450. The data decoder 430 decodes the equalized data by using, e.g., a Viterbi algorithm, to thereby generate decoded data. The phase error detection block 450 generates the phase error signal PE based on the equalized data in the similar manner as in the phase error detection block 250 shown in FIG. 2. Thereafter, the phase error signal PE is transmitted to the interpolation circuit 410 for use in generating the interpolation data.

Figure 5:
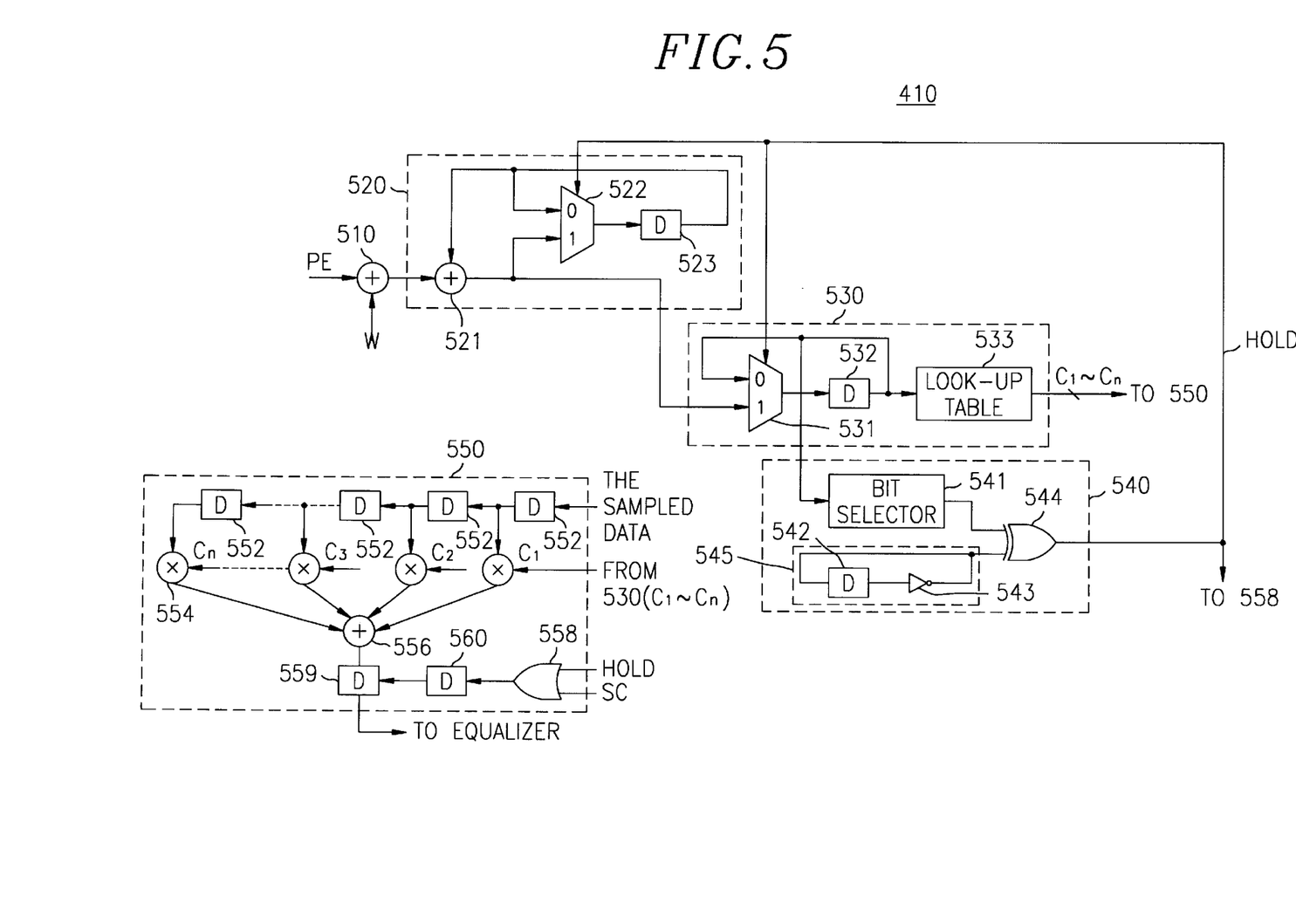
FIG. 5 depicts a detailed block diagram for an interpolation circuit shown in FIG. 4 in accordance with the present invention.

Referring to FIG. 5, there is shown a detailed block diagram of the interpolation circuit 410. As shown in FIG. 5, the interpolation circuit 410 includes an adder 510, an accumulation block 520, a filter coefficient generation block 530, a HOLD signal generation block 540, and an interpolator 550.

The accumulation block 520 containing an adder 521, a switch 522, and a delay 523, generates an accumulated signal by accumulating a signal inputted from the adder 510 with a delayed signal fed from the delay 523. Thereafter, the accumulation block 520 transmits the accumulated signal to the filter coefficient generation block 530.

The filter coefficient generation block 530 provided with a switch 531, a delay 532, and a look-up table 533, generates a set FC of filter coefficients $C_1$ to $C_n$ in response to the accumulated signal from the accumulation block 520, n being a predetermined positive integer.

The HOLD signal generation block 540, which contains a bit selector 541, a feedback loop block 545 having a delay 542 and an inverter 543 and an XOR gate 544, generates a HOLD signal according to a signal transmitted from the filter coefficient generation block 530, wherein the HOLD signal is fed to the switches 522 and 531 and the interpolator 550.

The interpolator 550 contains n number of delays 552's, corresponding number of multipliers 554's, an adder 556, an AND gate 558, and delays 559 and 560. The sampled data is sequentially delayed by the delay 552 and multiplied by filter coefficients $C_1$–$C_n$. The multiplied values are added by the adder 556 and stored in the delay 559 in response to a control signal from the AND gate 558. The delayed signal is outputted to the equalizer filter 420 shown in FIG. 4.

Now, the operation of the interpolation circuit 410 will be described in detail with reference to FIGS. 5 and 6. For convenience of explanation, only the interpolation coefficient W as defined above will be considered by assuming that the phase error signal PE from the phase error detection block 450 shown in FIG. 4 is zero. For example, assuming that the interpolation coefficient W is "01.01" denoted by a binary value representing 2's complement. For the binary value of "01.01", the first bit from the left represents a sign bit, the second bit indicates an integer bit, and the remaining two bits denote decimal values. Therefore, the binary value of "01.01" corresponds to "1.25" in decimal numeration.

If a first interpolation coefficient W, i.e., "01.01", is inputted to the accumulation block 520 shown in FIG. 5, the binary value is added in the adder 521 to a delayed signal value from the delay 523. The first accumulated signal value is "01.01" since the initial delayed signal value from the delay 523 is zero. And then, the accumulated signal value is transmitted to the switch 522 and the filter coefficient generation block 530. Input terminals "0" and "1" of the switch 522 are coupled to the delay 523 and the adder 521, respectively; and inputs to the terminals "0" and "1" are coupled to the delay 523 when the HOLD signal has a first and a second logic values, e.g. "0" and "1", respectively. The initial value of the HOLD signal is set to "1" so that the accumulated signal value "01.01" is stored in the delay 523.

The switch 531 contained in the filter coefficient generation block 530 functions in an identical manner as the switch 522 in the accumulation block 520, and receives the accumulated signal value "01.01" transmitted from the accumulation block 520 and transmits same to the delay 532. Thereafter, the delay 532 delays the accumulated signal and transmits a delayed signal to the look-up table 533 and the HOLD signal generation block 540, and also feedbacks the delayed signal to the switch 531. After receiving the delayed signal, the look-up table 533 generates a set $FC_1$ of filter coefficients corresponding to the delayed signal fed thereto from the delay 532 and transmits same to the interpolator 550.

The bit selector 541 contained in the HOLD signal generation block 540 receives the delayed signal value "01.01" transmitted from the filter coefficient generation block 530 to select an integer bit, i.e., "1". In the meantime, the delay 542 and the inverter 543 forming the feedback loop block 545 are initialized to generate a signal value "0", the feedback loop block 545 generates "0" and "1" alternately. And then, the XOR gate 544 receives the outputs of the bit selector 541 and the feedback loop block 545. As well known in the art, the XOR gate 544 generates the HOLD signal having the second logic value, i.e., "1" according to the XOR logic operation. Therefore, the HOLD signal having the second logic value, i.e., "1" is transmitted to the switches 522 and 531 to thereby control them as described above.

Figure 6:
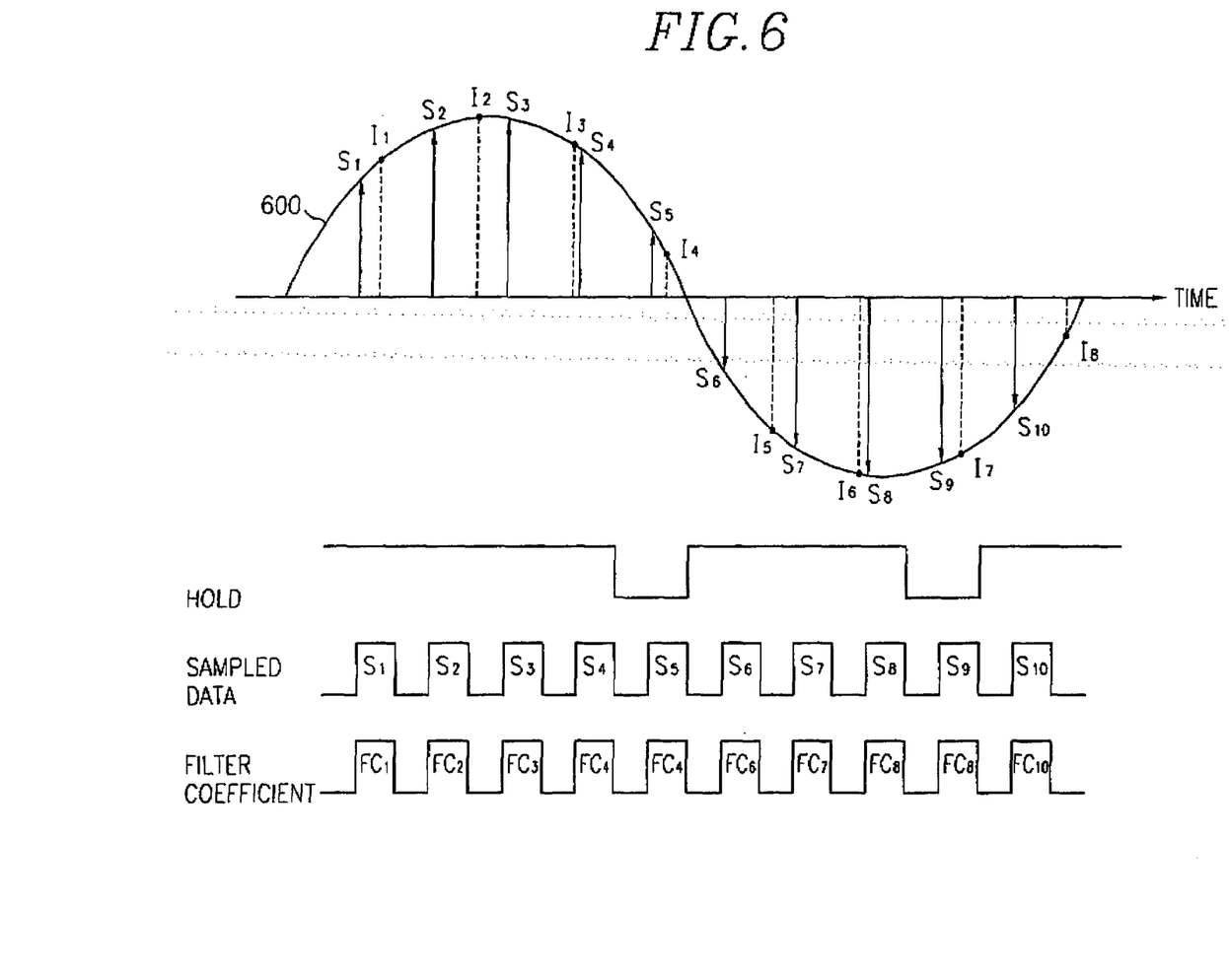
FIG. 6 demonstrates a timing diagram for explaining the operation of the interpolation circuit shown in FIG. 5.

The interpolator 550 receives the sampled data, i.e., $S_1$ from the A/D converter 40, and the set $FC_1$ of filter coefficients as shown in FIG. 6, to thereby generate interpolated data $I_1$ using both of the sampled data $S_1$ and the set $FC_1$ of the filter coefficients inputted thereto, the interpolated data $I_1$ being stored at the delay 559.

Next, if a second interpolation coefficient W value "01.01" is inputted to the accumulation block 520, the adder 521 accumulates the second interpolation coefficient value "01.01" with the delayed signal value "01.01" from the delay 523. Therefore, the accumulated signal value is "10.10". And then, the accumulated signal value "10.10" is transmitted to the switch 522 and the filter coefficient generation block 530. At this time, the accumulated signal value "10.10" is transmitted to the delay 523 via the terminal "1" of the switch 522 since the HOLD signal still has the second logic value, i.e., "1". And then, the delay 523 is updated with the accumulated signal value "10.10".

The switch 531 contained in the filter coefficient generation block 530 receives the accumulated signal value "10.10" transmitted from the accumulation block 520 and transmits the received accumulated signal to the delay 532 since it is connected to the terminal "1" thereof. Thereafter, the delay 532 delays the received accumulated signal and transmits a delayed signal to the look-up table 533 and the HOLD signal generation block 540, and feedbacks the delayed signal to the switch 531. After receiving the delayed signal, the look-up table 533 responses to the delayed signal from the delay 532 to thereby generate a set $FC_2$ of a filter coefficients corresponding to the delayed signal, and transmits the $FC_2$ to the interpolator 550.

The bit selector 541 receives the delayed signal value "10.10" to select an integer bit, i.e., "0" and transmits the selected integer bit to the XOR gate 544. At this time, the feedback loop block 545 generates a binary value "1" as described above. And then, the XOR gate 544 receives the outputs of the bit selector 541 and the feedback loop block 545 to generate a HOLD signal having the second logic value "1" as described above. Owing to the HOLD signal having the second logic value, the switches 522 and 531 are still connected to the terminal "1" thereof. Thereafter, the interpolator 550 receives sampled data, i.e., $S_2$ from the A/D converter 40, and the set $FC_2$ of the filter coefficients as shown in FIG. 6, to thereby store interpolated data $I_2$ generated by using the sampled data $S_1$ and $S_2$ and the set $FC_2$ of the filter coefficients, and provide the previously stored interpolated data $I_1$ to the equalizer filter 420.

And next, if a third interpolation coefficient W value "01.01" is inputted to the accumulation block 520, the adder 521 accumulates the third interpolation coefficient value "01.01" with the delayed signal value "10.10" from the delay 523. Therefore, the accumulated signal value is "11.11". And then, the accumulated signal is transmitted to the switch 522 and the filter coefficient generation block 530. At this time, the accumulated signal value "11.11" is transmitted to the delay 523 via the terminal "1" of the switch 522 since the HOLD signal still has the second logic value, i.e., "1". And then, the delay 523 is updated with the accumulated signal value "11.11".

The switch 531 contained in the filter coefficient generation block 530 receives the accumulated signal value "11.11" transmitted from the accumulation block 520 and transmits same to the delay 532 since it is connected to the terminal "1" thereof. Thereafter, the delay 532 delays the received accumulated signal and transmits a delayed signal to the look-up table 533 and the HOLD signal generation block 540, and also feedbacks the delayed signal to the switch 531. After receiving the delayed signal, the look-up table 533 responds to a delayed signal from the delay 532 to thereby generate a set $FC_3$ of filter coefficients corresponding to the delayed signal, and transmits the $FC_3$ to the interpolator 550.

The bit selector 541 receives the delayed signal value "11.11" to select an integer bit, i.e., "1" and transmits the integer bit to the XOR gate 544. At this time, the feedback loop block 545 generates a binary value "0" as described above. And then, the XOR gate 544 receives the outputs of the bit selector 541 and the feedback loop block 545 to generate the HOLD signal having "1" as described above. Owing to the HOLD signal having the second logic value, the switches 522 and 531 are still connected to the terminal "1" thereof. Thereafter, the interpolator 550 receives sampled data, i.e., $S_3$ from the A/D converter 40, and the set $FC_3$ of the filter coefficients as shown in FIG. 6, to thereby store interpolated data $I_3$ generated by using the sampled data $S_1$, $S_2$, and $S_3$ and the set $FC_3$ of the filter coefficients inputted thereto, and provide the previously stored interpolated data $I_2$ to the equalizer filter 420.

Thereafter, if a fourth interpolation coefficient W value "01.01" is inputted to the accumulation block 520, the adder 521 accumulates the fourth interpolation coefficient value "01.01" with the delayed signal "11.11" from the delay 523. And then, the accumulated signal value is "01.00". Thereafter, the accumulated signal is transmitted to the switch 522 and the filter coefficient generation block 530. At this time, the accumulated signal value "01.00" is transmitted to the delay 523 via the terminal "1" of the switch 522 since the HOLD signal still has the second logic level, i.e., "1". And then, the delay 523 is updated with the accumulated signal value "01.00".

The switch 531 contained in the filter coefficient generation block 530 receives the accumulated signal value "01.00" transmitted from the accumulation block 520 and transmits same to the delay 532 since it is connected to the terminal "1" thereof. Thereafter, the delay 532 delays the accumulated signal and transmits a delayed signal to the look-up table 533 and the HOLD signal generation block 540, and feedbacks the delayed signal to the switch 531. After receiving the delayed signal, the look-up table 533 responds to a delayed signal from the delay 532 to thereby generate a set $FC_4$ of filter coefficients corresponding to the delayed signal, and transmits the $FC_4$ to the interpolator 550.

The bit selector 541 receives the delayed signal value "01.00" to select an integer bit, i.e., "1", and transmits the integer bit to the XOR gate 544. At this time, the feedback loop block 545 generates a binary value "0" as described above. And then, the XOR gate 544 receives the outputs of the bit selector 541 and the feedback loop block 545 to generate the HOLD signal having the first logic value, i.e., "0". Owing to the HOLD signal having the first logic value, the switches 522 and 531 are connected to the terminal "0" thereof. Thereafter, the interpolator 550 receives sampled data, i.e., S4 from the A/D converter 40, and the set $FC_4$ of the filter coefficients as shown in FIG. 6, to thereby store interpolated data $I_4$ generated by using the sampled data $S_1$, $S_2$, $S_3$, and $S_4$, and the set $FC_4$ of the filter coefficients, and provide the previously stored interpolated data $I_3$ to the equalizer filter 420.

Next, if a fifth interpolation coefficient W value "01.01" is transmitted to the accumulation block 520, the adder 521 accumulates the fifth interpolation coefficient value "01.01" with the delayed signal value "01.00" from the delay 523. Therefore, the accumulated signal value is "10.01". And then, the accumulated signal is transmitted to the switch 522 and the filter coefficient generation block 530. At this time, the delayed signal value "01.00" is transmitted to the delay 523 via the terminal "0" of the switch 522 instead of the accumulated signal value "10.01" since the HOLD signal controls to change from the second logic value to the first logic value, i.e., "0".

The switch 531 included in the filter coefficient generation block 530 transmits the delayed signal value "01.00" to the delay 532 via the terminal "0" thereof as the same reason to the switch 522. Thereafter, the delay 532 transmits the delayed signal value "01.00" to the look-up table 533 and the HOLD signal generation block 540, and feedbacks the delayed signal to the switch 531. After receiving the delayed signal, the look-up table 533 responds to the delayed signal from the delay 532 to thereby generate the set $FC_4$ of the filter coefficients corresponding to the previously generated set $FC_4$ of the filter coefficients, and transmits the $FC_4$ to the interpolator 550.

The bit selector 541 receives the delayed signal value "01.00" to select an integer bit, i.e., "1", and transmits the integer bit to the XOR gate 544. At this time, the feedback loop block 545 generates a binary value "0" as described above. And then, the XOR gate 544 receives the outputs of the bit selector 541 and the feedback loop block 545 to generate the HOLD signal having the second logic value, i.e., "1". Owing to the HOLD signal having the second logic value, the switches 522 and 531 are connected to the terminal "1" thereof. Thereafter, the interpolator 550 receives sampled data $S_5$ from the A/D converter 40, and the set $FC_4$ of the filter coefficients as shown in FIG. 6, to thereby store interpolated data $I_5$ generated by using the sampled data $S_1$, $S_2$, $S_3$, $S_4$, and $S_5$ and the set $FC_4$ of the filter coefficients, and provide the previously stored interpolated data $I_4$ to the equalizer filter 420.

And next, following to the previous steps, interpolated data $I_6$ is stored in the delay 559 of the interpolator 550. At this time, owing to the HOLD signal having the first logic value, i.e., "0", the AND gate 558 generates a control signal updating the delay 559 with the interpolated data $I_6$ and blocking the $I_5$ to be transmitted to the equalizer filter 420, wherein the control signal is delayed in one sampling clock period at the delay 560.

As can be seen from the description, if the integer bit of the accumulated signal value has successively the same integer value, the HOLD signal generation block 540 generates the HOLD signal having the first logic value, i.e., "0", to thereby transmit the previously accumulated signal value to the interpolator 550 instead of the new accumulated signal value. Further, the filter coefficient generation block 530 generates the set of the filter coefficients corresponding to the previously accumulated signal value according to the HOLD signal having the first logic value. In this manner, next steps are performed so that interpolated data is generated from the interpolator 550.

Therefore, comparing with the prior art, a preferred embodiment of the present invention can achieve the reduced complexity in structure. Furthermore, the interpolated data is easily obtained in accordance with the present invention.

While the present invention has been shown and described with respect to the particular embodiments, it will be apparent to those skilled in the art that many changes and modifications may be made without departing from the spirit and scope of the invention as defined in the following claims.

What is claimed is:

1. A digital data detection system, including a simplified gate structural interpolation apparatus, for generating decoded data by detecting data stored on a magnetic storage medium by interpolating sampled data using a phase error signal and an interpolation coefficient, wherein the sampled data is sampled based on a sampling clock, comprising:

means of a magnetic medium, for storing the data;

means for detecting the stored data in the form of analog signals from the storing means;

means for amplifying the detected analog signals;

means for sampling the amplified analog signals in accordance with the sampling clock fed thereto from a MCU (main control unit) and generating sampled digital data;

means for interpolating the sampled digital data, in order to generate interpolated data, using the phase error signal and the interpolation coefficient;

means for equalizing the interpolated data;

means for generating decoded data by using a Viterbi algorithm employing maximum likelihood sequence detection; and means for detecting the phase error signal and transmitting the detected phase error signal to the interpolating means.

2. A simplified gate structural interpolation apparatus for generating interpolated data by detecting data stored on a magnetic storage medium by sampling the data using a phase error signal and an interpolation coefficient, wherein the sampled data is sampled based on a sampling clock fed from a MCU (Main Control Unit), comprising:

means for adding the phase error signal to the interpolation coefficient;

means for accumulating an output signal of the adding means;

means for generating a filter coefficient corresponding to the accumulated signal;

means for interpreting the accumulated signal to thereby generate a HOLD signal; and a filter means for generating interpolated data by processing the sampled data together with the corresponding filter coefficient.

3. The apparatus according to claim 2, wherein the accumulating means includes:

a delay for delaying an input signal thereto;

an adder for adding an output signal from the delay to the output signal of the adding means to generate the accumulated signal; and means for switching between the output signal from the delay and the accumulated signal in accordance with the HOLD signal to generate the input signal to the delay.

4. The apparatus according to claim 3, wherein the filter coefficient generating means includes:

means for delaying an input signal thereto;

means for switching between an output signal from the delaying means and the accumulated signal fed thereto from the accumulating means to generate the input signal to the delaying means wherein switchings carried out in accordance with the HOLD signal; and a filter coefficient generator for generating the filter coefficient, responsive to the output signal of the delaying means.

5. The apparatus according to claim 4, wherein the HOLD signal generating means includes:

means for selecting an integer bit from the output signal of the delaying means;

means for generating a first and a second logic values alternately; and a logic means for generating the HOLD signal in response to an output signal of the integer bit selecting means and an output signal of the first and the second logic values generating means.

6. The apparatus according to claim 5, wherein the first and the second logic values are "0" and "1", respectively.

7. An interpolation method for generating interpolated data by detecting data stored on a magnetic storage medium by sampling the data using a phase error signal and an interpolation coefficient, wherein the sampled data is sampled based on a sampling clock fed from a MCU (Main Control Unit), comprising the steps of:

a) adding the phase error signal to the interpolation coefficient;

b) accumulating the added signal;

c) generating a filter coefficient corresponding to the accumulated signal;

d) interpreting the accumulated signal to thereby generate a HOLD signal; and e) generating the interpolated data by processing the sampled data together with the corresponding filter coefficient.

8. The method according to claim 7, wherein the step b) includes the steps of:

b1) delaying an input signal;

b2) adding an output signal from the delaying step b1) to the output signal of the adding step a) to generate the accumulated signal; and b3) switching between the output signal of delaying step b1) and the accumulated signal based on the HOLD signal to generate the input signal.

9. The method according to claim 8, wherein the c) step includes the steps of:

c1) delaying an input signal;

c2) switching between an output signal from the delaying step c1) and the accumulated signal based on the HOLD signal to generate the input signal to the delaying step c1); and c3) generating the filter coefficient, responsive to the output signal of the delaying step c1).

10. The method according to claim 9, wherein the d) step includes the step of:

d1) selecting an integer bit from the delayed signal generated in the filter coefficient generating step c);

d2) generating a first and a second logic values alternately; and d3) generating the HOLD signal in response to an output signal of the integer bit selecting step d1) and an output signal of the first and the second logic values generating step d2).

11. The method according to claim 10, wherein the first and the second logic values are "0" and "1", respectively.

* * * * *